United States Patent [19]

Hobson et al.

[11] 4,187,066

[45] Feb. 5, 1980

[54] APPARATUS FOR THE PREPARATION OF DISPLAY BLOCKS OF UREA FORMALDEHYDE FOAM

[75] Inventors: John A. Hobson, Minneapolis; Paul K. Schilling, St. Paul, both of Minn.

[73] Assignee: H & S Industries, Inc., St. Paul, Minn.

[21] Appl. No.: 840,225

[22] Filed: Oct. 7, 1977

[51] Int. Cl.² ............................................. B29D 27/00
[52] U.S. Cl. .................................... 425/327; 425/377; 425/817 F; 425/461
[58] Field of Search ............... 425/4 C, 817 C, 224, 425/327, 376 R, 461, 377; 264/176 R, 51, 52

[56] References Cited

U.S. PATENT DOCUMENTS

| 3,248,464 | 4/1966 | Telkes | 425/817 C X |
| 3,523,988 | 8/1970 | Roehr et al. | 425/4 C X |
| 4,017,245 | 4/1977 | Lang | 425/817 C X |

Primary Examiner—Mark Rosenbaum
Attorney, Agent, or Firm—Orrin M. Haugen; Thomas J. Nikolai

[57] ABSTRACT

A method and apparatus for the preparation of thermosetting foam products on a substantially continuous basis, and wherein the products are characterized by uniformity of formulation, dimensional accuracy, and dimensional stability. The invention contemplates the utilization of an extruder which receives raw, partially or fully expanded resin and fillers or additives at inlets thereof, with initial expansion occurring within the confines of the extruder. The initially expanded resin is passed through a first expansion chamber with an intermediate expansion zone therein, with the outlet from the first expansion chamber being modestly constricted. From the first expansion chamber, the partially or fully expanded resinous product is moved through a second expansion chamber wherein the intermediate zone is enlarged, so as to permit substantially full expansion of the resinous material therewithin. From the second expansion chamber, the resinous material is passed through an outlet port in the form of an extrusion die, and received on a product receiving surface with a configuration substantially matching the configuration of the extrusion die for supporting the substantially completely expanded resin therein until cured to a self-supporting state.

4 Claims, 3 Drawing Figures

APPARATUS FOR THE PREPARATION OF DISPLAY BLOCKS OF UREA FORMALDEHYDE FOAM

BACKGROUND OF THE INVENTION

The present invention relates generally to an improved method and apparatus for the substantially continuous preparation of thermosetting plastic resinous products, and more particularly to such a method and apparatus which produces products having a composition which is substantially uniform, and which is dimensionally accurate and stable. The method and apparatus of the present invention provides a pair of in-line expansion chambers for the thermosetting products, with the first expansion chamber receiving the partially completely frothed material, and with the second expansion chamber being designed to receive the product in substantially completely expanded form.

In the preparation of frothed resinous products, particularly products made from thermosetting resinous materials, uniformity of composition, and uniformity and stability of dimensions are frequently desirable and in some cases, requisite. It is frequently desirable to extrude these foam products in order to achieve production efficiency, and when the composition may be maintained uniform, and the dimensions substantially constant, production can be maintained on a substantially continuous basis, and hence on an economically sound schedule.

Because of the rising costs of energy, particularly fuels used in heating of residential and industrial buildings, greater attention has been given to the utilization of thermosetting foams in the construction industry. Specifically, foamed-in-place resins have been recommended for utilization as thermal insulation, however these materials have not always been successfully installed. Problems arise due to overfilling or underfilling the voids, thereby establishing a thermal insulation layer or barrier having a density which is either unreasonably high or unreasonably low, thereby reducing the efficiency of the thermal barrier. It has been found that much of the volume ordinarily filled with foamed-in-place resin may be filled with solid rectangular frothed materials having a dimension matching that of the width, for example, of the volume to be filled. Ordinarily, the pre-formed thermosetting foams may be cut to desired length, and thereafter set in place.

SUMMARY OF THE INVENTION

The method and apparatus of the present invention is generally adapted for use with all thermosetting foams, and is particularly useful in connection with those urea-formaldehyde foams which are widely used for thermal insulation purposes at present. Urea-formaldehyde foams are, of course, widely available commercially, and have a wide range of utility outside of the thermal insulation area. The method and apparatus of the present invention is adapted for use with virtually any foam product which is susceptible of preparation by extrusion techniques.

Briefly, and in accordance with the present invention, an apparatus is provided which includes, on an in-line basis, an extruder which is arranged to discharge partially cured frothed product into a surge chamber, with the discharge from the surge chamber being passed through an expansion chamber which allows continued expansion of the product, with the discharge from the expansion chamber being through an extrusion die which, of course, has a cross-sectional area which is less than the cross-sectional area of the expansion chamber. The individual components of the system has certain features which are desirable for acdomplishing the production of foamed products in accordance with the present invention.

The extruder is provided with first and second inlets, with the first inlet or inlets being arranged to receive filler and/or additive materials, and with the second inlet, disposed inwardly of the first inlets, being arranged to deliver raw, partially, or fully expanded resin and foaming agents into the extruder. The screw is designed so as to allow thorough and complete mixing of the raw, partially, or fully expanded resin and fillers and/or additives as the material passes through the extruder chamber, and generally axially along the barrel. Thorough mixing is accomplished by utilizing a compression chamber at the exit end of the extruder. Preferably, the flow rate into the extruder is such that very little, if any, pressure is applied to the foam product as it moves along the length of the barrel, and through the various screw flights. A surge chamber is provided at the discharge end of the extruder, thus eliminating changes in pressure within the extruder due to anomalous changes in pressure, feed rates, resin or foaming agent consistency, or the like. The outlet from the surge chamber is passed into an expansion chamber which permits the partially cured foam product to become substantially fully expanded, and thereafter discharged through the die at the end of the expansion chamber.

Preferably, the discharge from the extruder is delivered to a product receiving station which is in the form of a continuously moving conveyor, the product receiving station having a configuration substantially matching that of the desired configuration of the finished product, and normally including top walls, bottom walls, and side walls, and being designed to move at a rate substantially equal to that of the axial rate of the product being discharged from the extruder system.

Therefore, it is a primary object of the present invention to provide an improved method and apparatus for the substantially continuous preparation of frothed thermosetting plastic resinous products.

It is a further object of the present invention to provide an improved method and apparatus for the substantially continuous preparation of frothed thermosetting resinous products wherein the raw, partially, or fully expanded resin is delivered into an extruder, with the discharge from the extruder passing serially through a pair of expansion chambers, such as an initial surge chamber, and subsequently through an expansion chamber from which the fully expanded or frothed foam is delivered onto a moving conveyor flight and retained within an enclosure.

It is yet a further object of the present invention to prepare frothed thermosetting plastic resinous products of uniform composition and dimension.

It is yet a further object of the present invention to provide an improved method and apparatus for the substantially continuous preparation of frothed thermosetting plastic resinous products wherein the products have uniform dimensions from start-up, and which have highly desirable uniformity of composition, shape, dimension, and surface finish.

Other and further objects of the present invention will become apparent to those skilled in the art upon a study of the following specification, appended claims, and accompanying drawing.

DESCRIPTION OF THE PREFERRED EMBODIMENT

Figure 1:
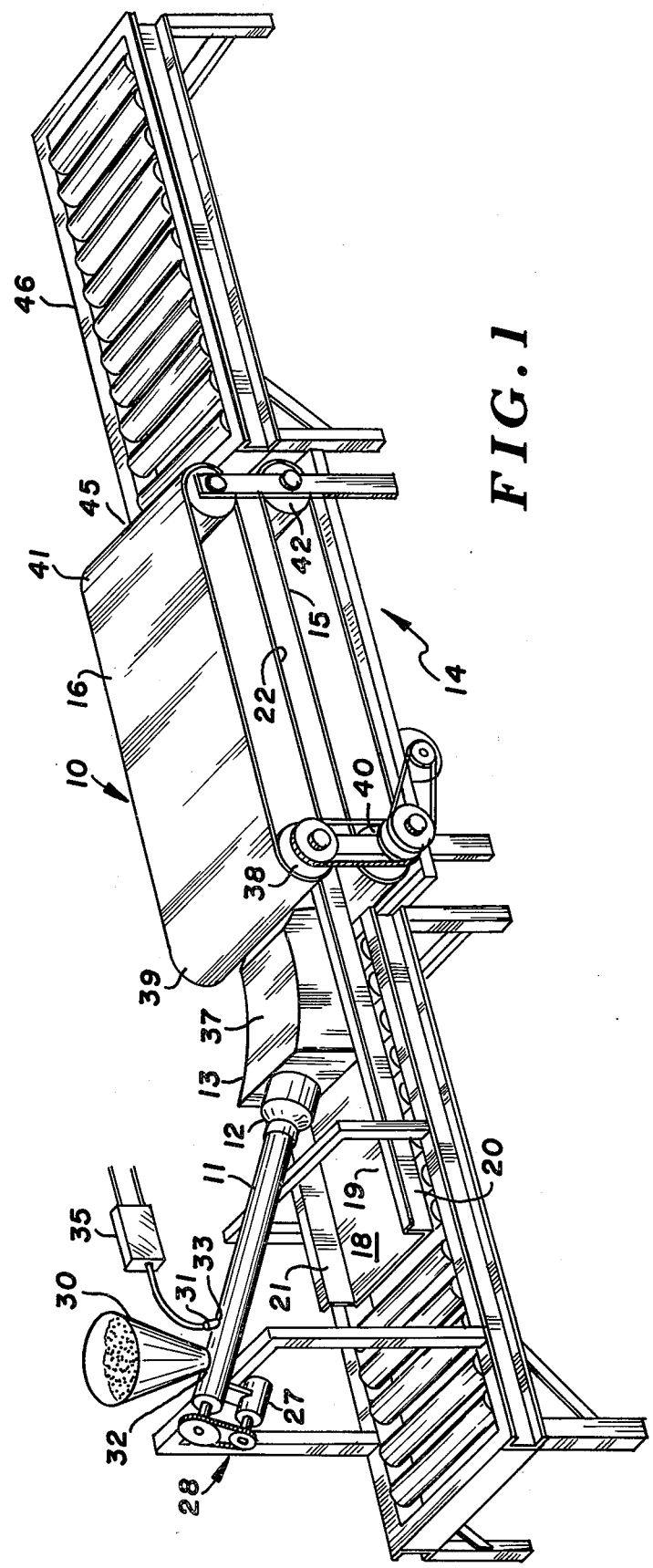
FIG. 1 is a perspective view of the system of the present invention, and illustrating the extruder together with the serially arranged expansion zones, and the product receiving conveyor.

With attention being directed to FIG. 1 of the drawing, the system generally designated 10 is adapted for the preparation of frothed thermosetting plastic resinous products, and includes the basic components of an extruder 11, a surge chamber 12 coupled to the extruder, and an expansion chamber 13 which receives the discharge from the surge chamber. The output from expansion chamber 13 is delivered to the product receiver generally designated 14 which is in the form of a conveyor having a lower flight 15 and an upper flight 16, which substantially mate together so as to form a portion of the product receiving chamber. A product receiving tray shown at 18 has a bottom wall 19 together with side walls 20 and 21, with the top wall for the product receiver being the lower span 22 of upper conveyor flight 16.

Figure 2:
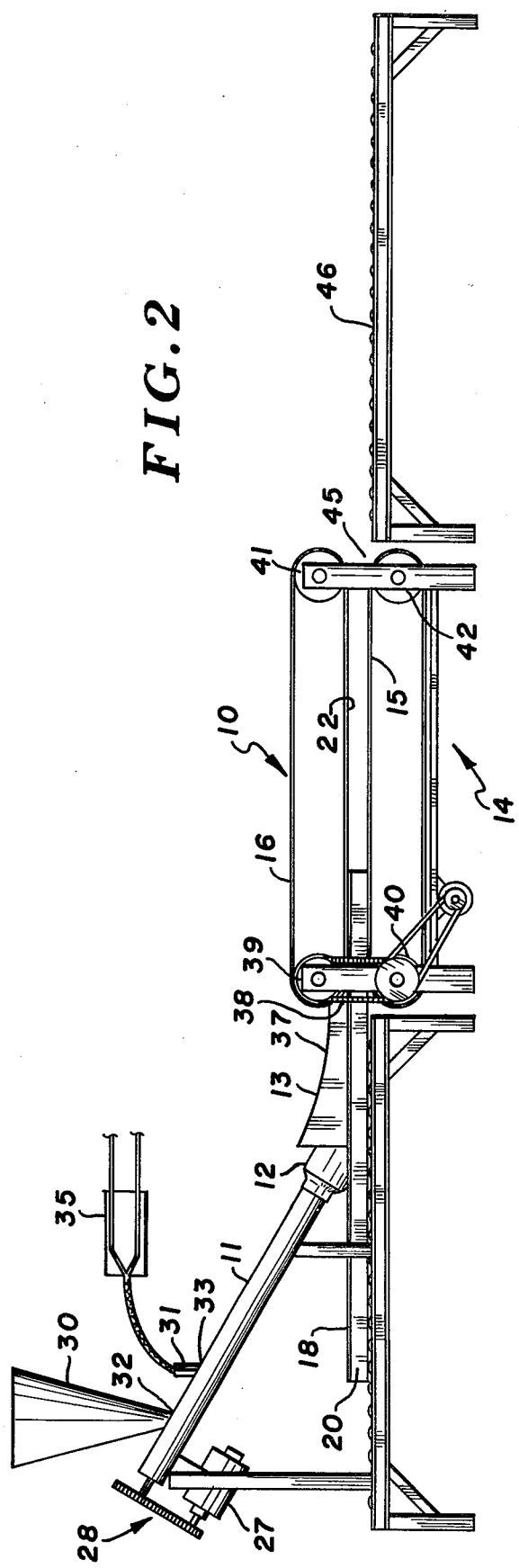
FIG. 2 is a side elevational view of the system, and illustrating the arrangement as illustrated in FIG. 1.

Turning now to the details of extruder 11, and with particular attention being directed to FIGS. 1 and 2 of the drawing, extruder 11 comprises a barrel 25 having a screw 26 journaled therewithin in bearings disposed at the opposed ends of barrel 25. The inner confines or circumference of barrel 25 together with the individual flights of screw or auger 26 provide the flights for extruder 11 to deliver product therefrom. A suitable means such as a motor or the like as illustrated at 27 is utilized to drive screw or auger 26 through an appropriate drive linkage such as the chain and sprocket drive illustrated generally at 28.

A first inlet is provided in the form of a hopper as shown at 30, and a second inlet is shown as at 31. Basically, fillers or other materials are charged or delivered into extruder 11 through the hopper 30, with an inlet from the hopper to the extruder barrel being shown as at 32. A second inlet port is provided to the extruder as at 33, in combination with the second inlet 31. As has been indicated, the raw resin material to be frothed within the system is introduced into the extruder through inlet 31. The space or axial distance between inlet 30 and 31 provides a distance capable or susceptible of thorough mixing of filler and/or additive materials prior to their being co-mixed or intermingled with the raw resin.

The resin together with fillers and/or additives passes axially along the barrel 25 of extruder 11 until encountering the first surge chamber as at 12. The first surge chamber 12 is an expansion zone which permits modest expansion of the frothed material, with subsequent forcing or extruding of the partially cured material from chamber 12 into expansion chamber 13. A die is provided for this purpose, and normally has a cross-sectional area which is greater than the largest cross-sectional area of surge chamber 12. Generally speaking, however, the system is designed so as to permit free flow of the materials through the extruder barrel without subjecting any of these materials to excessive pressures, forces, or the like. It will be understood, therefore, that the fundamental purpose of extruder 11 is to achieve a thorough mixing of the various materials in the formulation, along with a partial cure and partial frothing of the foamed thermosetting materials.

If desired, the hopper 30 may be one of a vibratory feed type, with such vibratory feeders being, of course, commercially available. The arrangement for delivering raw resin may be in the form of a foam gun, with one example of such a foam gun being shown as at 35, foam guns for delivery of thermosetting resinous materials being, of course, commercially available. No unusual characteristics in a foam gun are required for this application.

As has been indicated, extruder 11 is arranged so as to provide a minimal super-pressure to the material contained therewithin. To achieve this result, therefore, the axis of the extruder 11 is preferably disposed at approximately 30° from the horizontal, thereby permitting a certain amount of free gravitational flow of material along the axis of the extruder and accordingly along the extruder flights. Thus, the foam is permitted to rise or froth freely essentially without compression due to operation of the extruder, it being understood that any angle of inclination for the extruder barrel may be workable.

Figure 3:
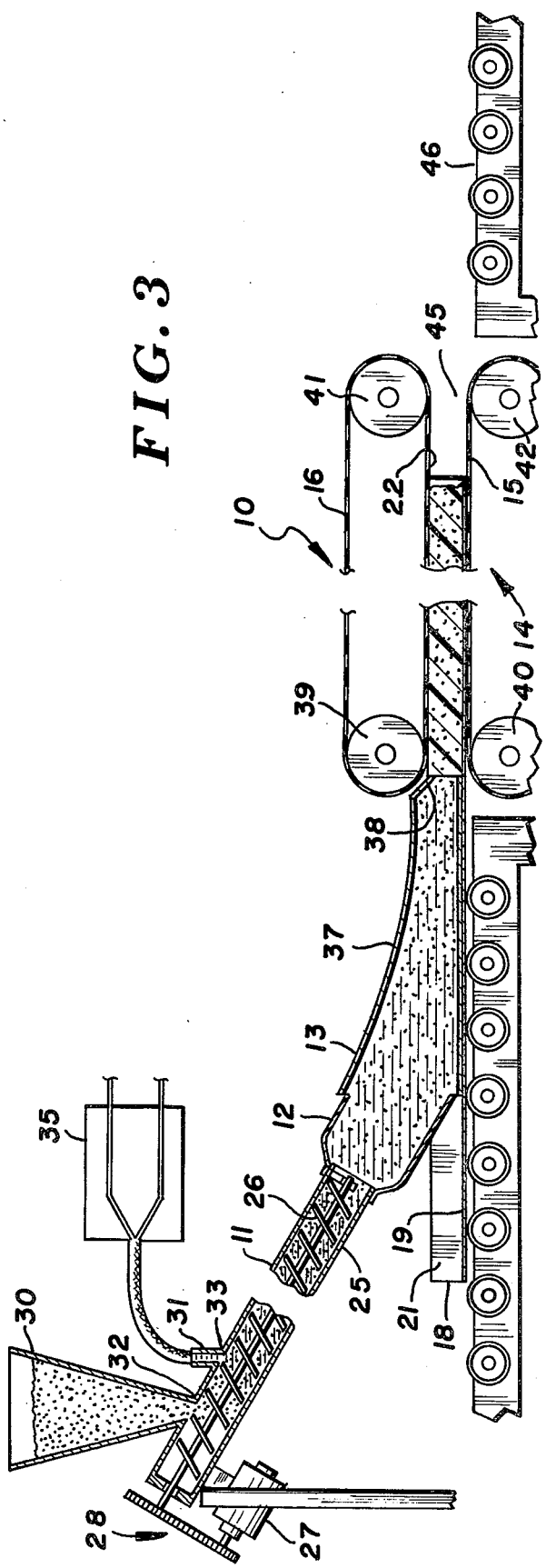
FIG. 3 is a detail side elevational view, partially cut away and showing components in section, and illustrating the detail of the components receiving the discharge from the conveyor, with FIG. 3 beig illustrated on a slightly enlarged scale.

With continued attention being directed to FIGS. 1 and 2 of the drawing, it will be observed that the second expansion chamber 13 is disposed essentially at the discharge end of surge chamber 12, with the inlet thereto being shown in cross-section in FIG. 3. The configuration of chamber 13 is one which is at its maximum adjacent the inlet thereto. A slowly but continuously confining profile is provided as illustrated at 37, with the cross-sectional area of chamber 13 decreasing at a rate of approximately 10% or more for each 40% of length.

In other words, the decrease in cross-sectional area is such that the outlet from chamber 13 has a cross-sectional area approximately 25% less than the cross-sectional area adjacent the inlet of chamber 13. Such a profile permits immediate expansion of the thermosetting material as it enters the chamber 13, along with gradual compression thereof pending discharge from the die as at 38 (see FIG. 3). It has been found that the provision of the surge chamber 12 enhances the ability of the product to properly fill the extrusion die to allow the material to be extruded on an immediate start-up basis, thereby conserving product and also providing for uniformity of the finished product.

As has been indicated, the product delivered from the extruder system is picked up on the product receiver, which includes a base receiving tray 18 together with a constantly moving upper surface such as the lower span 22 of conveyor flight 16, although it will be appreciated that other types of product receivers may be employed, such as, for example, a continuously moving conveyor having a bottom, top, and opposed sides formed from conveyor flights. The conveyors 15 and 16 are in the form of endless belts driven by drive cylinders 39 and 40, along with idler cylinders 41 and 42. Each of the cylinders is, of course, provided with drive shafts for journal mounting within suitable bearing or drive structures. Such conveyors, of course, are widely used and commercially available. Preferably, the upper flight 16 utilizes an endless belt prepared essentially from a material having release properties when placed into contact with curing resin material. A surface treatment with a suitable release material such as stearic acid, silicone, or the like may be desirable, and may be dispensed across the width of the flight 16 by a suitable brush applicator if desired. In certain instances, a silicone rubber flight may be employed, in which case, no separate release substance may be required.

Upon discharge from the outlet end 45 of conveyor system 14, the product is recieved on a support surface as at 46, preferably on a wheeled roller bed or the like for ulitmate cooling and possibly post-cure operations.

As has been indicated, the system of the present invention is particularly useful for the preparation of frothed thermosetting resinous products. Urea-formaldehyde has been stated to be one froth material particularly adapted for product preparation within this system. In addition, other frothed thermosetting products such as epoxy foam resin products, melamine foam resin products, phenol-formaldehyde products, and the like. It will be appreciated that the term "thermosetting" is used in a rather comprehensive, broad and encompassing form, and certain thermoplastic products may be included since they may be treated and prepared in accordance with the apparatus of the present invention. For example, certain thermoplastic materials treated with a fugitive solvent may be used so as to render the materials in an expanded form. Examples of such materials are vinyl products, styrene-butadiene copolymers, and certain latex materials, preferably of the acrylic type.

In the fabrication of certain types of thermal insulation products for buildings, residential or commercial, it may be desirable in certain instances to utilize a backing in the form of a coated film or the like, so as to form an integral portion or part of the thermal insulation. Specifically, a film such as a film of polyethylene, paper, or the like is treated with a film of adhesive, which adhesive responds to the presence of the extruded material, and thus becomes permanently bonded thereto. The foil material, in addition to forming a vapor barrier, may also be provided with a metallized coating so as to provide some reflective surface to reduce radiative losses.

We claim:

1. Apparatus for the continuous preparation of frothed thermosetting plastic resinous products including:
   (a) extruder means having an auger confined within a barrel and defining an extruder chamber, and first and second feed inlets to said chamber, and an outlet from said chamber;
   (b) chamber means defining a surge chamber in communication with the outlet from said extruder chamber, and the outlet from said extruder chamber to said surge chamber having a cross-sectional area which is significantly less than the cross-sectional area of said surge chamber;
   (c) an elongated expansion chamber in communication with the outlet from said surge chamber, said expansion chamber having a cross-sectional area which decreases generally uniformly and gradually by approximately 25% along substantially the entire length thereof, and having a product extrusion outlet at the end thereof; and wherein:
   (d) the outlet from said expansion chamber has a cross-sectional configuration substantially as desired in the final frothed thermosetting plastic resinous product.

2. Apparatus as defined in claim 1 being particularly characterized in that said outlet from said expansion chamber is coupled to a continuously moving product receiver, said product receiver having a top wall, a bottom wall, and side walls for retaining the product delivered from said expansion chamber.

3. The apparatus as defined in claim 1 being particularly characterized in that said extruder is provided with first and second spaced inlets adjacent the inlet end thereof, and wherein substantially solid fillers and/or additives are introduced into said first inlet disposed closely adjacent said inlet end, and wherein raw plastic resinous material is introduced into said second inlet disposed axially from said first inlet ports and toward said extruder outlet.

4. The apparatus as defined in claim 1 being particularly characterized in that the outlet port of said expansion chamber is a die for forming the configuration of the final product.

* * * * *

UNITED STATES PATENT OFFICE
CERTIFICATE OF CORRECTION

PATENT NO. : 4,187,066
DATED : February 5, 1980
INVENTOR(S) : John A. Hobson and Paul K. Schilling It is certified that error appears in the above-identified patent and that said Letters Patent are hereby corrected as shown below:

Column 6, line 36, Claim 3, "and" (second occurrence) should read -- end --. Line 41, delete the word "ports".

Signed and Sealed this

Twentieth Day of May 1980

[SEAL]

Attest:

SIDNEY A. DIAMOND

Attesting Officer          Commissioner of Patents and Trademarks